United States Patent
Suzuki

(10) Patent No.: US 8,773,729 B2
(45) Date of Patent: Jul. 8, 2014

(54) IMAGE PROCESSING APPARATUS, IMAGE PROCESSING METHOD, AND COMPUTER PROGRAM PRODUCT

(75) Inventor: Takeshi Suzuki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 145 days.

(21) Appl. No.: 13/416,259

(22) Filed: Mar. 9, 2012

(65) Prior Publication Data

US 2012/0236334 A1 Sep. 20, 2012

(30) Foreign Application Priority Data

Mar. 18, 2011 (JP) .................................. 2011-060740
Oct. 14, 2011 (JP) .................................. 2011-226372

(51) Int. Cl.
*H04N 1/40* (2006.01)

(52) U.S. Cl.
USPC ......................................... 358/468; 382/173

(58) Field of Classification Search
USPC ............ 358/1.9, 2.1, 1.2, 468, 462, 448, 400, 358/500, 406, 504, 518; 382/164, 171, 173, 382/175–180, 191, 298–299, 108
See application file for complete search history.

(56) References Cited

U.S. PATENT DOCUMENTS 7,212,772 B2    5/2007  Kasiske et al.
2006/0187505 A1*  8/2006  Ng et al. ...................... 358/518

FOREIGN PATENT DOCUMENTS

| JP | 2003-341186 | 12/2003 |
| JP | 2007-11028 | 1/2007 |
| JP | 2007-199291 | 8/2007 |
| JP | 2008-532066 | 8/2008 |
| WO | 2006/091366 A1 | 8/2006 |

* cited by examiner

*Primary Examiner* — Thomas D Lee
*Assistant Examiner* — Stephen M Brinich
(74) *Attorney, Agent, or Firm* — Oblon, Spivak, McClelland, Maier & Neustadt, L.L.P.

(57) ABSTRACT

An image processing apparatus that generates a pattern of a colorless recording material to form an image using the colorless recording material includes: a region dividing unit that divides an input image into a plurality of regions as divided regions using a designated algorithm and pixel values of pixels that form the image; a spatial-frequency calculating unit that calculates spatial frequencies in each of the divided regions into which the image has been divided using pixel values in the divided region; and a pattern generating unit that generates a pattern of the colorless recording material, which is set to each of the divided regions, using the calculated spatial frequencies and a line pattern having a preset line width.

19 Claims, 9 Drawing Sheets

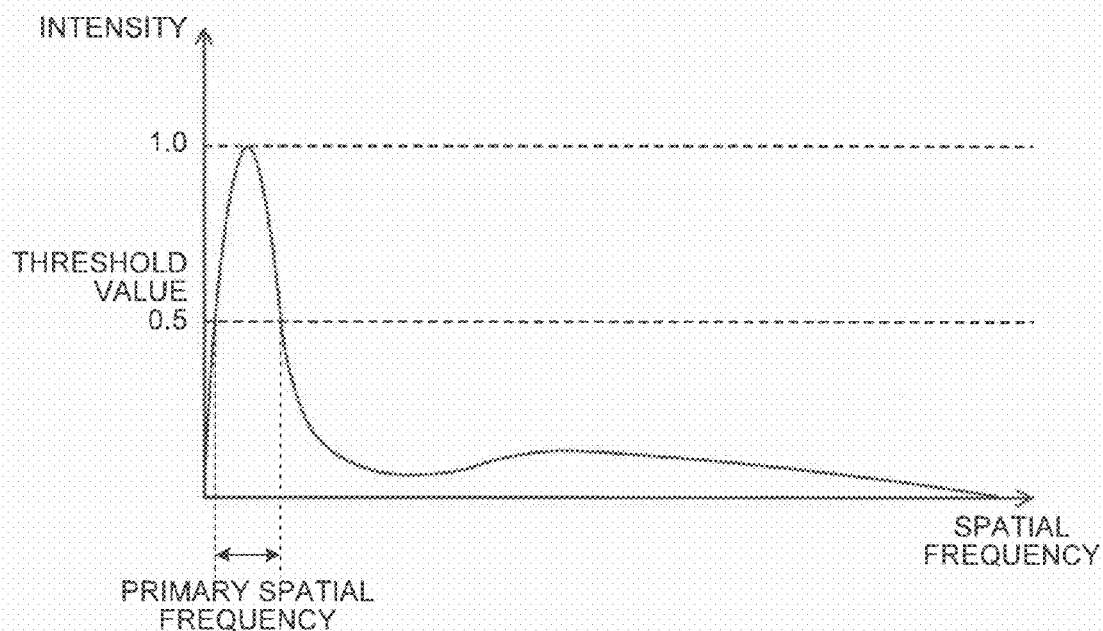

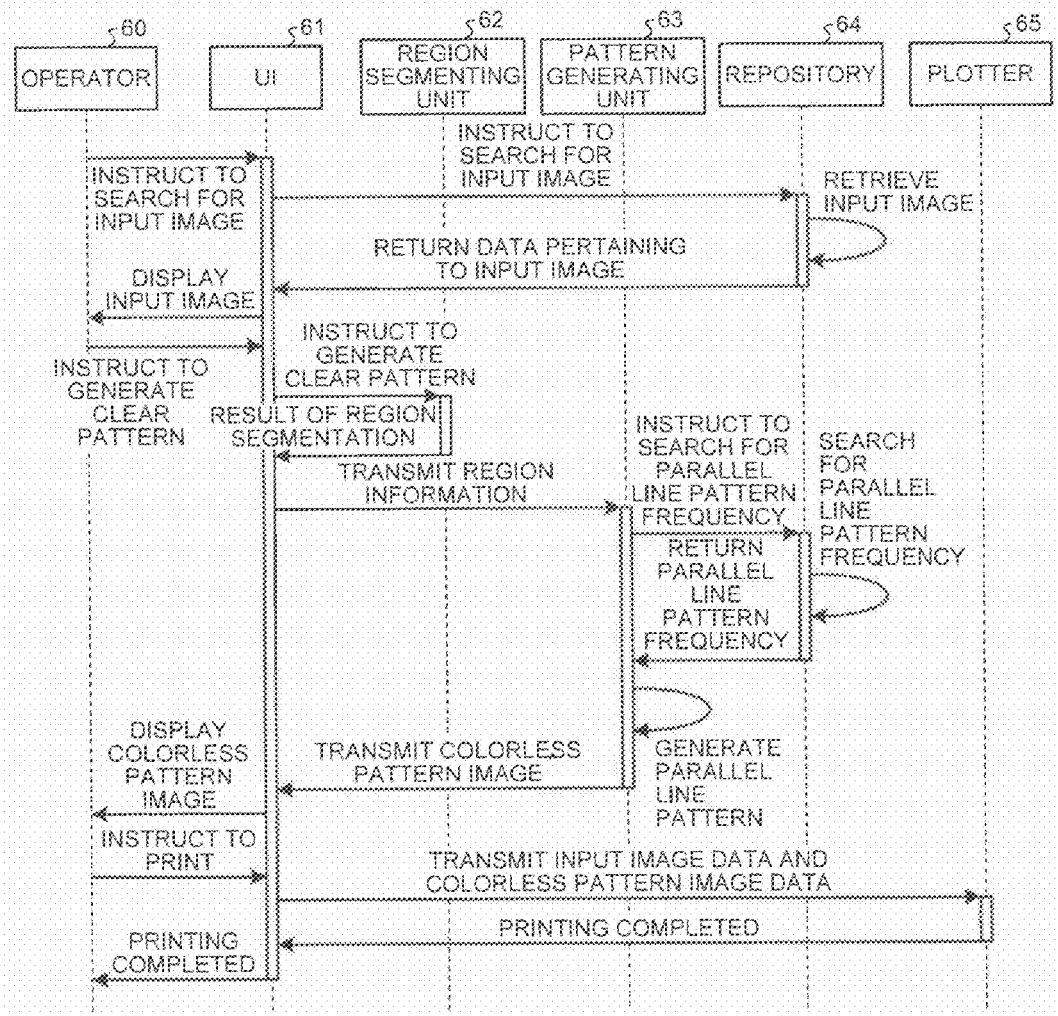

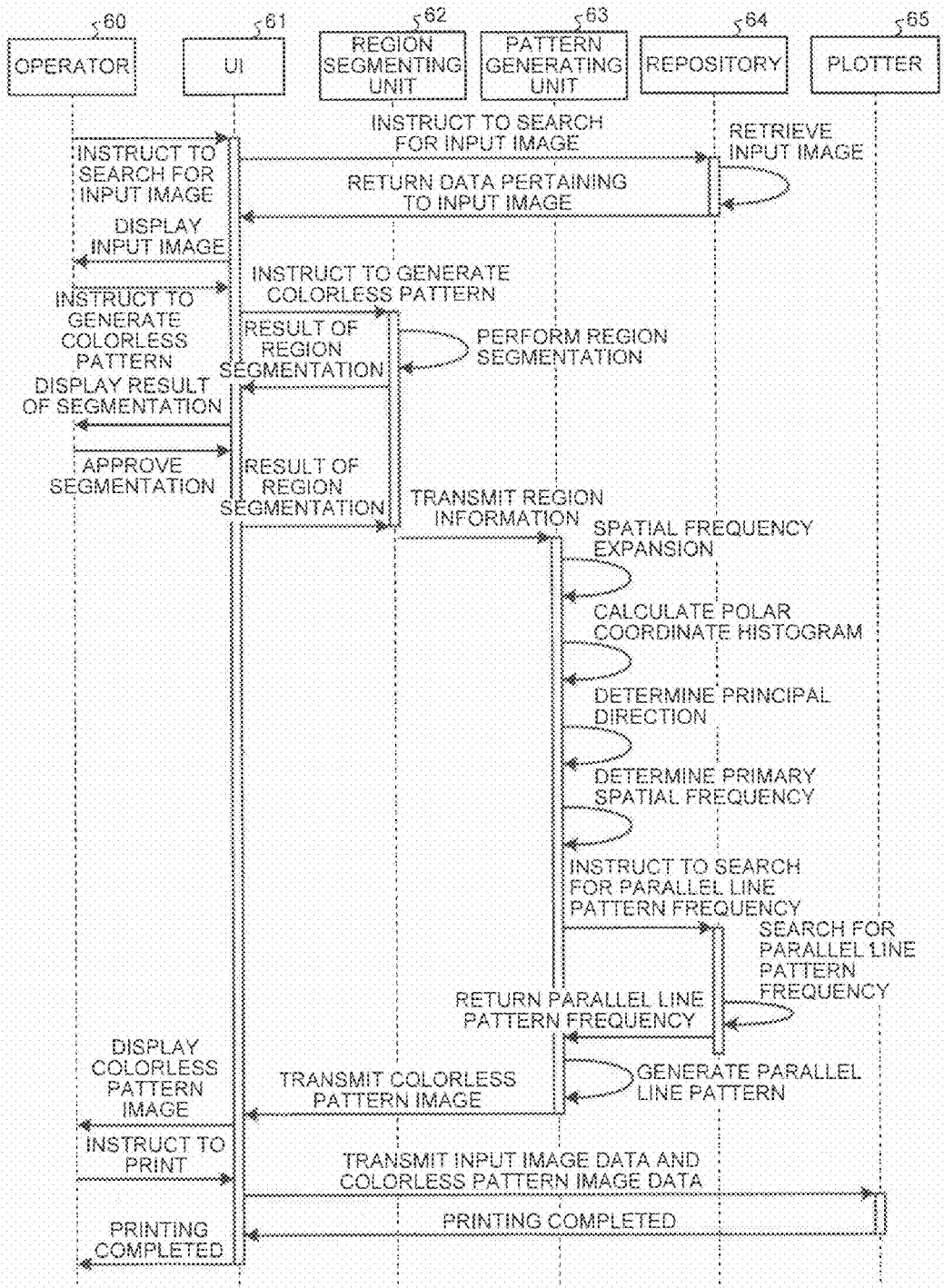

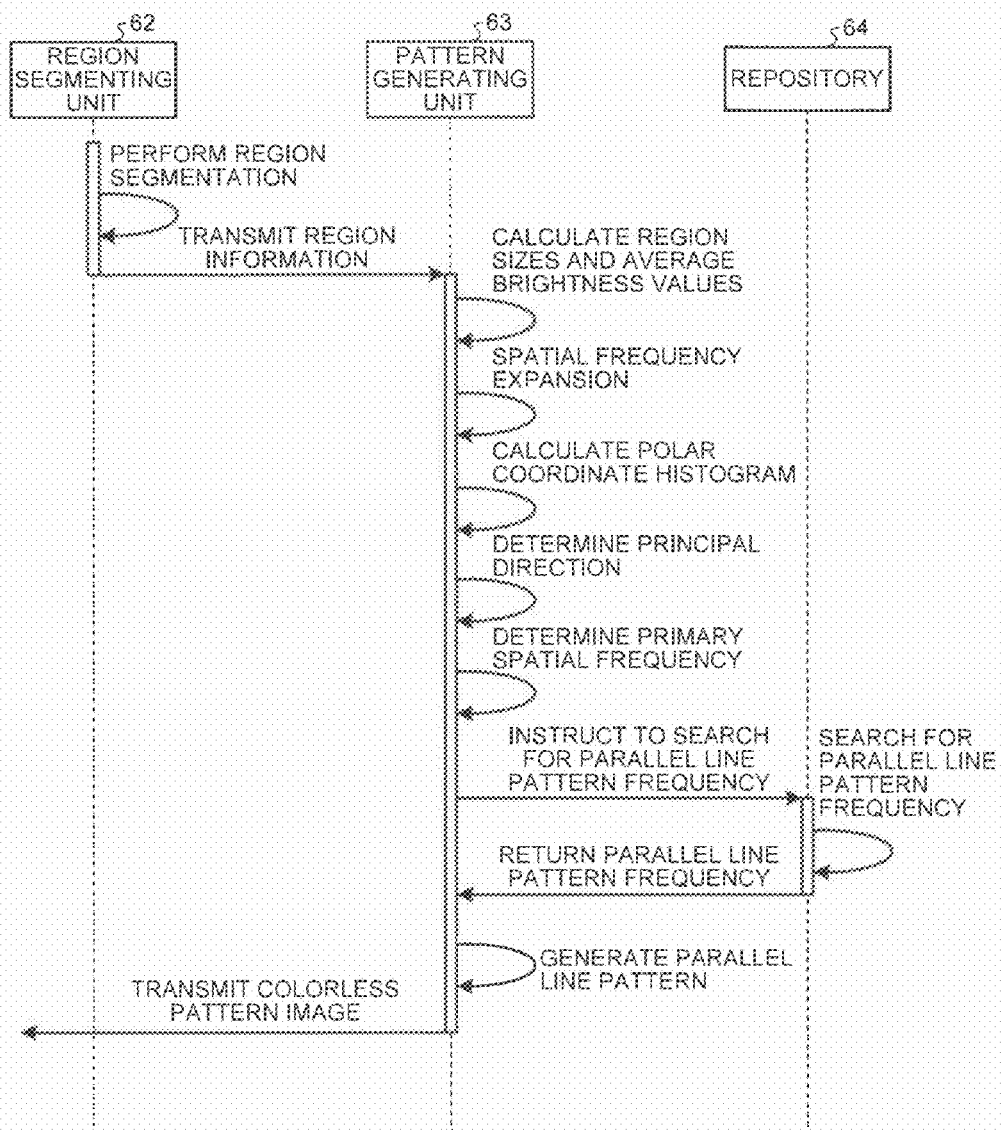

FIG.10

| REGION NUMBER | REGION SIZE | AVERAGE BRIGHTNESS |
|---|---|---|
| 1 | 50 | 60 |
| 2 | 120 | 80 |
| ... | ... | ... |
| n | 100 | 150 |

FIG.11

| REGION SIZE | LUT TO BE USED |
|---|---|
| 1 TO 100 | LUT s1 |
| 101 TO 1,000 | LUT s1 |
| 1,001 TO 10,000 | LUT s2 |
| 10,001 OR GREATER | LUT s3 |

FIG.12

| AVERAGE BRIGHTNESS | LUT TO BE USED |
|---|---|
| 1 TO 50 | LUT i1 |
| 51 TO 100 | LUT i2 |
| 101 TO 150 | LUT i3 |
| 151 TO 200 | LUT i3 |
| 201 TO 255 | LUT i3 |

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2011-060740 filed in Japan on Mar. 18, 2011 and Japanese Patent Application No. 2011-226372 filed in Japan on Oct. 14, 2011.

BACKGROUND OF THE INVENTION

1. Field of the Invention

The present invention relates to an image processing apparatus and an image processing method for generating a pattern using a colorless recording material, such as transparent toner or transparent ink, to form an image, and a computer-readable storage medium containing designations for causing a computer to execute the method.

2. Description of the Related Art

Printers capable of high-quality printing of a photograph taken with a digital camera have been available in recent years. Such a printer typically performs printing with toner or ink of four colors, e.g., yellow (Y), cyan (C), magenta (M), and black (K). Colorless, transparent toner is used in some cases to improve a gloss of an image or to enhance toner transferring efficiency so as to increase image quality. There are known technologies for performing printing using colorless, transparent toner.

Proposed in Japanese Patent Application Laid-open No. 2003-341186 is a technology to overcome the disadvantage associated with projection of a full-color image formed on a transparent film or a transparency through a transmission-type overhead projector (OHP). This disadvantage results from projected light that is scattered by a non-smooth portion of an image surface and contains an achromatic component. The achromatic component narrows a color reproduction range of a projected image as compared with that of a printed image, from which light is reflected to be viewed by a viewer, and also makes the projected image poor in coloration because color tone of the projected image undesirably contains gray-color components that are not contained in the original image. According to the proposed technology, in addition to color toners, transparent toner is transferred onto a transfer member to make an image surface smooth, thereby achieving high image quality.

Proposed in Japanese Patent Application Laid-open No. 2007-011028 is a technology to overcome the disadvantage in that a total toner amount is increased by a considerable amount when transparent toner is used as compared with conventional four-color printing and accordingly a large load is placed on a series of processes in electrophotographic processing. The proposed technology aims at reducing the load by performing operations as follows: a total amount of C, M, Y, and K toners is calculated; an allowable amount of the transparent toner is calculated from the total toner amount; the allowable amount is converted into a print-area ratio of the transparent toner; a masking pattern for masking a transparent-toner signal is generated using the print-area ratio of the transparent toner; and masking is performed using a designated transparent toner image and the masking pattern.

Proposed in Japanese Patent Application Laid-open No. 2007-199291 is a technology to overcome the disadvantage in that formation of a toner image on an entire surface of an image with transparent toner undesirably makes consumption of the transparent toner considerably large as compared with those of other toners, causing a developing agent for the transparent toner to degrade faster than developing agents for the other toners and, furthermore, causing running cost to increase because transparent toner is generally expensive. According to this technology, a region corresponding to a face of a person is extracted from image data and labeled as a feature region, while another region is labeled as a non-feature region. Then, a greater amount of transparent toner is applied to the feature region than the non-feature region.

Proposed in Japanese National Publication of International Patent Publication No. 2008-532066 is a technology for producing visible and tactilely detectable texture that appeals to visual sensation and tactile sensation using transparent toner, thereby to apply a transparent-toner pattern to a region where a specific color toner is applied as well as to apply a pattern across an entire surface of a sheet.

However, using the technology described in Japanese Patent Application Laid-open No. 2003-341186, it is not possible to apply a transparent-toner pattern to a specific region selected from an image. The technology described in Japanese Patent Application Laid-open No. 2007-011028 assumes that the masking pattern is a character string, such as "CONFIDENTIAL," and a region to which a transparent-toner pattern is to be applied needs to be determined by a user. Accordingly, it is difficult to automate application of masking.

With the technology described in Japanese Patent Application Laid-open No. 2007-199291, selection is made of a region where spatial frequencies serving as a feature for regional division are low. Accordingly, this technology aims at reducing unevenness of color toners that is noticeable in low-frequency regions and adjusts only the transparent toner amount in a region-adaptive manner, but not at applying a transparent-toner pattern in a region-adaptive manner. With the technology described in Japanese National Publication of International Patent Publication No. 2008-532066, a transparent-toner pattern can be applied to a region where toner of a specific color is applied. However, this technology is less region-adaptive because this technology does not take account of a relation between an image feature of the region and the pattern to be applied thereto.

When a transparent-toner pattern is generated with transparent toner, it is necessary to specify an image region where transparent toner is to be applied and determine what pattern is to be applied. As also described in Japanese Patent Application Laid-open No. 2007-199291, an image region can be specified based on a feature of the region. However, determination as to what pattern is to be applied cannot be made in a region-adaptive manner with a known technology. With these techniques, it is difficult to improve a gloss of a specific region or providing specific unevenness to an image or to impart unique texture to the image.

Under the above circumstances, provision of an apparatus or a method that can determine a transparent-toner pattern in a region-adaptive manner has been desired; with the apparatus or the method, a gloss of a specific region in an image can be improved and specific unevenness can be provided to the image so as to impart unique texture to the image.

SUMMARY OF THE INVENTION

It is an object of the present invention to at least partially solve the problems in the conventional technology.

An image processing apparatus that generates a pattern of a colorless recording material to form an image using the colorless recording material includes: a region dividing unit that divides an input image into a plurality of regions as divided regions using a designated algorithm and pixel values of pixels that form the image; a spatial-frequency calculating unit that calculates spatial frequencies in each of the divided regions using pixel values in the divided region; and a pattern generating unit that generates a pattern of the colorless recording material, which is set to each of the divided regions, using the calculated spatial frequencies and a line pattern having a preset line width.

An image processing method for causing an image processing apparatus to generate a pattern of a colorless recording material to form an image using the colorless recording material includes: dividing an input image into a plurality of regions as divided regions using a designated algorithm and pixel values of pixels that form the image; calculating spatial frequencies in each of the divided regions using pixel values in the divided region; and generating a pattern of the colorless recording material, which is set to each of the divided regions, using the spatial frequencies calculated at the calculating and a line pattern having a preset line width.

A computer program product that includes a non-transitory computer-usable medium having a computer-readable program code embodied in the medium causes a computer to instruct an image processing apparatus that generates a pattern of a colorless recording material to form an image using the colorless recording material to function as an image processing method implemented therein. The image processing method includes: dividing an input image into a plurality of regions as divided regions using a designated algorithm and pixel values of pixels that form the image; calculating spatial frequencies in each of the divided regions using pixel values of pixels that form the region; and generating a pattern of the colorless recording material, which is set to each of the divided regions, using the spatial frequencies calculated at the calculating and a line pattern having a preset line width.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of a relation between a spatial frequency and a normalized intensity;

FIG. 6 is a diagram illustrating an example of a data structure of a look-up table (LUT);

FIG. 7 is a sequence diagram illustrating an example of operations to be performed by the image processing apparatus;

FIG. 8 is a detailed sequence diagram according to the embodiment, illustrating operations to be performed by a pattern generating unit and a repository;

FIG. 9 is a detailed sequence diagram according to another embodiment, illustrating operations to be performed by the pattern generating unit and the repository;

FIG. 10 is a diagram illustrating an example of a data structure for managing a region size and an average brightness value;

FIG. 11 is a diagram illustrating an example of a data structure in which a region size and an LUT to be used are stored by being associated with each other;

FIG. 12 is a diagram illustrating an example of a data structure in which an average brightness value and the LUT to be used are stored by being associated with each other.

DETAILED DESCRIPTION OF THE PREFERRED EMBODIMENTS

Figure 1:
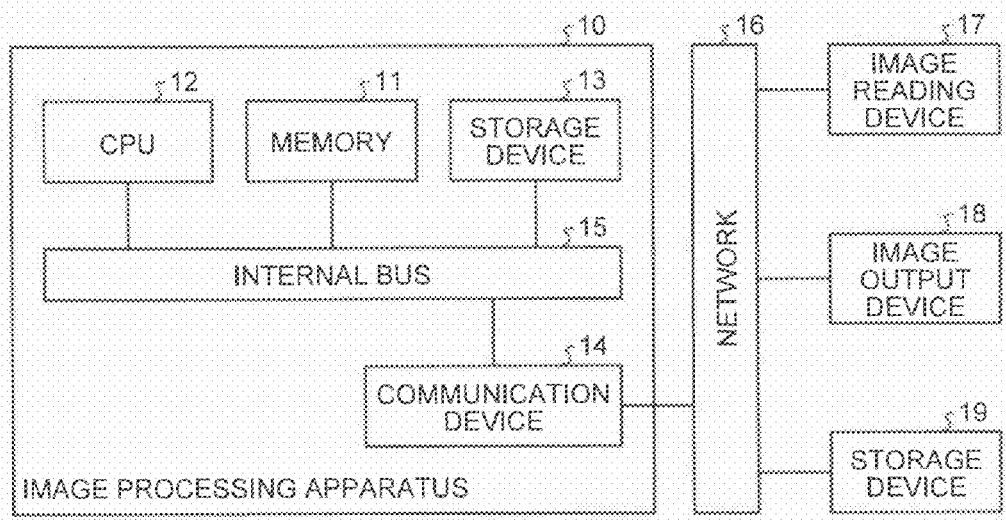
FIG. 1 is a diagram illustrating a hardware configuration of an image processing apparatus according to an embodiment.

FIG. 1 is a diagram illustrating a hardware configuration of an image processing apparatus according to an embodiment. An image processing apparatus 10 can have a hardware configuration similar to that of an ordinary personal computer (PC). More specifically, the image processing apparatus 10 includes a memory 11 that stores a computer program including a instruction sequence, a central processing unit (CPU) 12 that reads the computer program stored in the memory 11 or the like and executes the computer program, a storage device 13 that stores the computer program and data, a communication device 14 that performs communications with external equipment, and an internal bus 15 that connects the devices to one another as illustrated in FIG. 1.

The memory 11 is also referred to as a main storage device and is a storage device directly accessible by the CPU 12. The memory 11 includes a random access memory (RAM) that is readable and writable, and a read-only memory (ROM). Stored in the ROM is a basic input/output system (BIOS), which is a computer program for performing inputs and outputs, and firmware, which is a computer program for controlling hardware. The RAM reads and writes data from and to a memory cell specified by address information obtained as an address signal.

The storage device 13 is also referred to as an auxiliary storage device and is used to permanently store computer programs and data because the main storage device is typically a volatile memory that loses information stored therein when power supply is cut and also relatively expensive. Examples of the auxiliary storage device include a hard disc drive, a compact disk (CD)-ROM, a digital versatile disk (DVD), universal serial bus (USB) memory, a memory card, and a solid state drive (SSD).

The CPU 12 processes data or the like by reading a computer program stored in the memory 11 or the storage device 13 in an order of the instruction sequence, and interpreting and executing the instruction sequence. The communication device 14 communicates information by connecting a network 16 to the CPU 12, by receiving information over the network 16, and by transmitting information to the network 16 according to an instruction fed from the CPU 12. The internal bus 15 connects the memory 11, the CPU 12, the storage device 13, and the communication device 14 to one another so as to enable data reading/writing and information communication.

The image processing apparatus 10 can cope with an image reading device 17, an image output device 18, and a storage device 19 that are connected to the network 16 using the communication device 14 for performing operations of acquiring, outputting, and storing image data. Examples of the image reading device 17 include a device such as a scanner capable of reading an image to acquire image data. Examples of the image output device 18 include a printer that receives image data and outputs the image data to a printing medium such as paper. Examples of the storage device 19 include a server apparatus that manages various types of data pieces and a database that stores the indexed data.

As described above, the image processing apparatus 10 is connected to the image reading device 17, the image output device 18, and the storage device 19 via the network 16. Accordingly, the image processing apparatus 10 can receive input image information acquired by the image reading device 17, stores the input image information in the memory 11, processes the image information according to a predetermined processing method, stores a result of the processing in the storage device 13 or the storage device 19 via the network 16. The image processing apparatus 10 can also transmit the stored processed image information to the image output device 18 via the network 16 to cause the image output device 18 to produce a print output according to an instruction designated from a user.

The image processing apparatus 10 processes input image information according to a predetermined processing method. This can be implemented by the CPU 12 by executing a computer program read from the memory 11 or the like. The program includes a plurality of instruction sequences, each of which is executed sequentially. It is possible to cause the CPU 12 that executes each instruction sequence to function as each of units to be described below. Hence, the image processing apparatus 10 can be considered to include the units to be described below.

Figure 2:
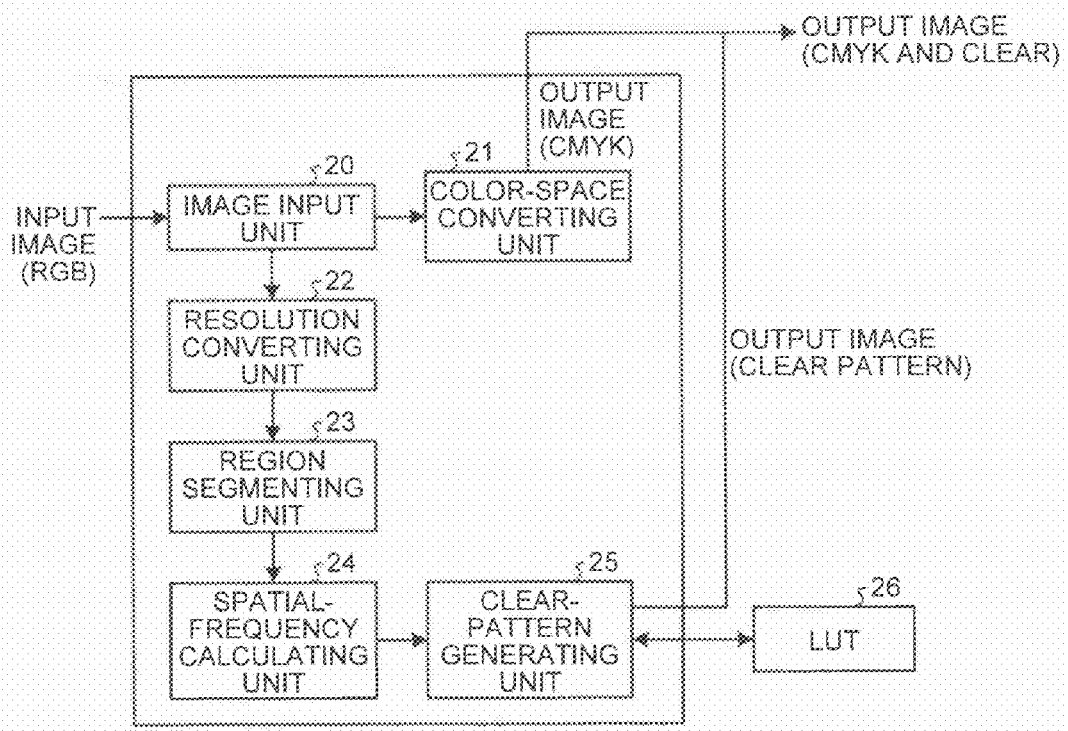
FIG. 2 is a functional block diagram of the image processing apparatus.
Figure 3A:
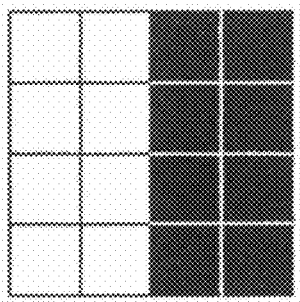
FIGS. 3A to 3F are diagrams illustrating examples of Haar wavelets.
Figure 3B:
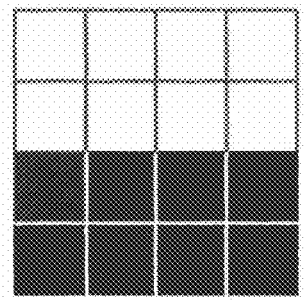
Figure 3C:
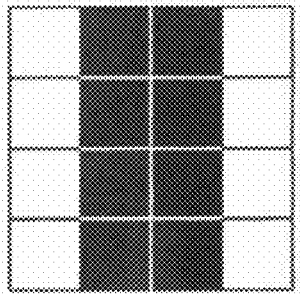
Figure 3D:
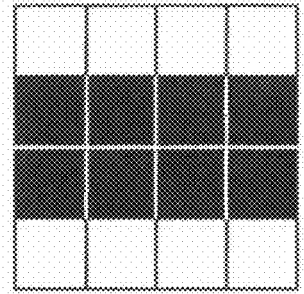
Figure 3E:
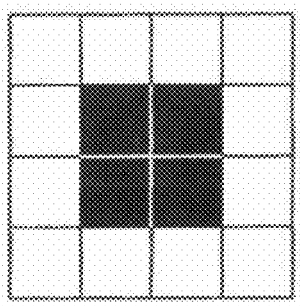
Figure 3F:
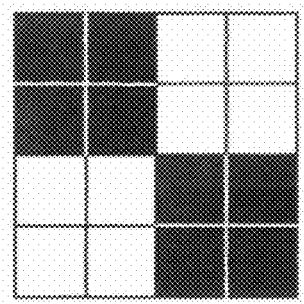

FIG. 2 is a functional block diagram of the image processing apparatus 10. The image processing apparatus 10 includes an image input unit 20 that receives an image in a form of image data input from the image reading device 17 illustrated in FIG. 1 or the like as an input image (digital image), and a color-space converting unit 21 that performs color space conversion. The color space conversion needs to be performed to adapt an input image, which is in many cases represented in RGB colors, to color material (e.g., CMYK) for use by a printer or a plotter.

The image processing apparatus 10 generates a transparent toner pattern, that is, a colorless pattern, for an image forming apparatus such as the printer or the plotter that performs image formation with transparent toner in addition to the four color toners of the C, M, Y, and K toners. As preprocessing for generating the colorless pattern, the image processing apparatus 10 performs resolution conversion for enlarging or reducing the size of the input image and smoothing that makes brightness values, which are used as pixels values of pixels for forming the image and the like, more uniform and smooth. The image processing apparatus 10 further includes a resolution converting unit 22 so as to perform these operations. Although transparent toner is used in this example, any colorless recording material such as transparent ink can be used. Accordingly, color ink or the like can be used in lieu of the other toners such as the color toners. When an image signal is for a monochrome image, brightness values are used as the pixel values; however, when the image signal is for a color image, a brightness value Y and two color signals U, V for colors are used as the pixel values.

After completion of the preprocessing, the image processing apparatus 10 performs regional division on the image that has been input to the image processing apparatus 10 using a designated algorithm and calculates spatial frequencies representing a feature amount of the image in each of regions obtained by the regional division. The image processing apparatus 10 then obtains a peak spatial frequency and an orientation thereof in each of the regions based on the calculated spatial frequencies. The image processing apparatus 10 determines and generates a transparent-toner pattern to be applied to each of the regions based on the peak spatial frequency and the orientation thereof in the region. The peak spatial frequency is a spatial frequency that occupies a majority in the spatial frequencies of the region. The orientation is a direction that points from the origin to a point where the peak spatial frequency appears when spatial frequencies are represented in a two-dimensional coordinate system.

To perform these operations, the image processing apparatus 10 further includes a region dividing unit 23 that performs the regional division, a spatial-frequency calculating unit 24 that calculates the spatial frequencies corresponding to the feature amounts, and a colorless-pattern generating unit 25 that obtains the peak spatial frequency and the orientation thereof to generate the transparent-toner pattern. The colorless-pattern generating unit 25 obtains a primary spatial frequency in a primary orientation, which will be described later, using the peak spatial frequency and the orientation thereof and generates the transparent-toner pattern based on the correspondence between the primary spatial frequency and a spatial frequency in the transparent toner pattern. For this purpose, the image processing apparatus 10 further includes a lookup table (LUT) 26 that represents the correspondence between the primary spatial frequency and the spatial frequency in the transparent toner pattern.

The region dividing unit 23 can divide an image into regions using, for example, a split-and-merge algorithm. The split-and-merge algorithm attempts to divide an image into uniform regions. The algorithm starts processing from initial presumption that an entire image is a single region, and determines whether the region is substantially uniform. More specifically, the algorithm makes determination based on a predetermined reference value of criterion. When the region is determined not to be uniform, the region is equally split into four smaller regions. This process is repeated on each of the sub-regions until no further splitting is needed. Then, the small regions that qualify the value of the criterion, adjacent to each other, and have similarities with each other are merged together. The process terminates when no further regions can be merged.

For a grayscale image, a region can be said to be substantially uniform and determined to be uniform when a variance of intensity (brightness), given by Equation (1) below, of the region is below a threshold value. In Equation (1), N denotes the number of pixels in the region; and x denotes a mean intensity of the region. As the intensity, brightness values can be used. When the variance is below the threshold value, the process terminates without splitting the region. On the other hand, when the variance is equal to or higher than the threshold value, the region is determined not to be substantially uniform and further split into four smaller regions. The threshold value serving as the criterion is to be determined in advance by performing experiment or the like.

$$\sigma = \left[ \frac{1}{N-1} \sum_{j=1}^{N} (x_j - x)^2 \right] \quad (1)$$

Merging of split regions is performed using a mean intensity of each region that has been calculated in a process of the splitting. One region can be merged with an adjacent region when the difference in the mean intensities therebetween is below a predetermined threshold value. For the details about the split-and-merge algorithm, see "Splitting and Merging" (URL: http://homepages.inf.ed.ac.uk/rbf/CVonline/LOCAL_COPIES/MARBLE/medium/segment/split.htm).

The regional division method using the split-and-merge algorithm is an iterative method for forming uniform regions. Other examples of the interactive method include a region-growing method. In the region-growing method, a plurality of seed regions that are uniform regions and are fundamental to the method are given, and an iterative process is performed to merge pixels that have not yet been classified to the given regions. The uniformity of the regions can be determined using a degree of similarity. The degree of similarity can be calculated using an absolute value of a difference between a gradation value of a pixel and an average of the gradation values of the pixels in the region or a distance in a color space therebetween. When the degree of similarity exceeds a threshold value that is the value of the criterion, the region can be determined to be uniform, while when the degree of similarity is below the threshold value, the region can be determined not to be uniform.

Algorithms for implementing the region-growing method include the watershed algorithm. In the watershed algorithm, designation of a seed region is received when a user uses a mouse or the like to designate a circular region for which the center can be arbitrary chosen in an image but the radius has a predetermined value. Each of the designated seed regions iteratively grows by merging a pixel that has not yet been merged as described above, thereby dividing the image into regions. The watershed algorithm involves a user interaction. Therefore, the region dividing unit 23 can perform regional division based on the algorithm by receiving designation of one or more regions designated by the user.

A clustering method or the like can alternatively be used as the method of the regional division. Brightness and color information can be obtained from pixels that form an image. Information about spatial frequencies and orientations and the like can be obtained from a pixel set that includes a plurality of pixels. The information can be extracted as feature amounts of the image. Effective feature amounts are to be distributed at higher density in a feature space into which the pixels are mapped. The group of feature amounts forms a sub-region of the image and is referred to as a cluster.

Algorithms for implementing the clustering method include the mean shift algorithm. The mean shift algorithm is based on the fact that high-density regions in a feature space correspond to maxima (mode) of the density function that expresses the distribution of the feature data and locates a point where a gradient of a density function is zero because the gradient thereof becomes at a mode.

There is a plurality of features including brightness, color, a spatial frequency, and an orientation thereof that characterizes an image. An arbitrarily chosen set of the features (a feature set) can be used in the mean shift algorithm. Accordingly, the region dividing unit 23 can perform automatic regional division using the mean shift algorithm based on a predetermined feature set.

The algorithms described above are example of the methods for implementing the regional division; however, available methods are not limited thereto. Any other known methods such as K-means method can be employed. The employed method can be implemented using an appropriate algorithm.

The spatial-frequency calculating unit 24 performs spatial frequency expansion using, for instance, two-dimensional fast Fourier transform (FFT) so as to calculate spatial frequencies for each of the regions into which the image is divided by the region dividing unit 23. In order to simplify this calculation, an RGB color image is once converted into a grayscale image and can be thereafter transformed with the two-dimensional FFT.

The two-dimensional Fourier transform is defined by Equation (2) below. In Equation (2), f(x, y) is a two-dimensional function in a real domain, while F(u, v) is a two-dimensional function in a corresponding Fourier-transformed domain. N is a sampling number. More specifically, f(x, y) is a value in the gray scale (brightness value) of a pixel in an image. F(u, v) is a two-dimensional spatial frequency at a point on the u-v plane. Meanwhile, u and v take values of 0, 1, 2, . . . , N−1.

$$F(u, v) = \int_{-\infty}^{\infty} \int_{-\infty}^{\infty} f(x, y) e^{-i2\pi(ux+vy)} dx dy \quad (2)$$

A generally-used two-dimensional discrete Fourier transform is defined by Equation (3) below. The fast Fourier transform is an algorithm for calculating discrete Fourier transforms at a high speed with a computer. Accordingly, spatial frequency expansion can be performed using the two-dimensional discrete Fourier transform.

$$F(u, v) = \sum_{y=0}^{N-1} \sum_{x=0}^{N-1} f(x, y) e^{-i2\pi(ux+vy)/N} \quad (3)$$

Equation (3) can be modified to Equation (4). As is indicated by Equation (4), the two-dimensional discrete Fourier transformation of the two-dimensional array f(x, y) can be performed by performing a one-dimensional discrete Fourier transformation with respect to x and thereafter performing another one-dimensional discrete Fourier transformation with respect to y. It is convenient to perform the discrete Fourier transformation given by Equation (3) by starting an index of an array from zero. Thus, Equation (3) is obtained by shifting the indexes in Equation (2) by N/2. Accordingly, it is necessary to shift the array of f(x, y) by N/2 before performing computation using Equation (3) and also to shift the indexes of F(u, v) which is a result of the computation.

$$F(u, v) = \sum_{y=0}^{N-1} e^{-i2\pi vy/N} \left[ \sum_{x=0}^{N-1} f(x, y) e^{-i2\pi uy/N} \right] \quad (4)$$

Each of f(x, y) and F(u, v) can be considered as a periodic function with the periodicity of N which is the sampling number. Accordingly, the shift can be performed in this case by interchanging a former half and a latter half of the array. When a region where both of the x and y coordinates are positive in the two-dimensional coordinate system is called a first quadrant; a region where the x coordinate is negative and the y coordinate is positive is called a second quadrant; a region where both of the x and y coordinates are negative is called a third quadrant; and a region where the x coordinate is positive and the y coordinate is negative is called a fourth quadrant, and if parting lines that divide an image into four regions are regarded as axes of coordinates, regions in the image having the x and y coordinates in the ranges that correspond to the quadrants described above can be considered as the first quadrant, the second quadrant, the third quadrant, and the fourth quadrant, respectively. Accordingly, an array obtained by interchanging the x coordinate in a positive range and that in a negative range of an original array and then performing a similar interchange with respect to the y direction is equivalent to an array obtained by performing an interchange between the first quadrant and the third quadrant, and by performing another interchange between the second quadrant and the fourth quadrant.

Provided below is a specific procedure for performing the two-dimensional fast Fourier transformation based on the above description. The first quadrant and the third quadrant of the two-dimensional array f(x, y) in the real domain are interchanged therebetween, and the second quadrant and the fourth quadrant are interchanged therebetween. Subsequently, two-dimensional array F(u, v) in the Fourier-transformed domain is obtained by using Equation (3). The first quadrant and the third quadrant, and the second quadrant and the fourth quadrant of the two-dimensional array F(u, v) thus obtained are interchanged, so that the two-dimensional Fourier transformation can be performed. For the details on this Fourier transformation, see "Dai 5-kai Fourier Henkan no Jissai no Keisan-hou" (URL: http://www.metro-hs.ac.jp/rs/sinohara/dft_210/mri_genkou5.htm).

A wavelet transform or the like can also be used in lieu of the two-dimensional fast Fourier transform described above. Because the Fourier transform does not have temporal resolution, the temporal resolution can be imparted to the Fourier transform by multiplying a window function so as to provide a localization property thereto as in short-time Fourier transform. However, the temporal resolution cannot be improved with a fixed width of the window function. In view of this disadvantage, a wavelet transform has been developed such that a wavelet function corresponding to the window function of the Fourier transform has a scaling parameter that allows an appropriate selection of a width of the wavelet function.

The wavelet transformation can be classified into a continuous wavelet transform and a discrete wavelet transform. The scaling parameter is allowed to take a continuous value in the continuous wavelet transform; however, basis functions of the wavelet function are non-orthogonal. In contrast, basis functions of the discrete wavelet transform are orthogonal, but a scaling parameter takes a discrete value. Likewise, the two wavelet transforms widely differ from each other, and a calculation efficiency and analytical accuracy vary widely depending on a wavelet to be used.

A Haar wavelet (discrete two-dimensional wavelet), which is one of discrete wavelets, as illustrated in FIGS. 3A to 3F can be used to improve a calculation efficiency. In a frequency calculation method using the Haar wavelet, an intermediate image that is called an integral image is generated, thereby to considerably reduce a calculation cost in the frequency analysis. For the details on the discrete wavelet transform, see "Risan Wavelet Henkan" (URL: http://homepages.inf.ed.ac.uk/rbf/CVonline/LOCAL_COPIES/MARBLE/medium/segment/split.htm). http://en.wikipedia.org/wiki/Discrete_wavelet_transform A spatial-frequency analysis using the discrete wavelet will be described later.

Various methods can be used to calculate two-dimensional frequencies of a region with an arbitrary shape. Among the methods, the simplest method is to surround an arbitrary-shaped region with a bounding box and to pad a gap therebetween with a predetermined value, such as a zero, thereby enabling to perform a two-dimensional frequency expansion.

Two-dimensional spatial-frequency information thus obtained is transmitted to the colorless-pattern generating unit 25. The colorless-pattern generating unit 25 determines a peak spatial frequency and the orientation thereof for each of the regions based on this information. First, a polar coordinate histogram is calculated from the two-dimensional spatial-frequency information so as to determine the primary orientation. An orientation where a peak value in the histogram of the polar coordinate system (polar coordinate histogram) is obtained is taken as the primary orientation of the region.

There are various methods for calculating the polar coordinate histogram. For instance, the histogram can be produced using frequencies obtained by binarizing a two-dimensional frequency distribution in comparison to a predetermined threshold value. An angular division for producing the histogram can be predetermined by performing a preliminary experiment or the like. For example, the angular division can be made in units of five degrees.

Figure 4A:
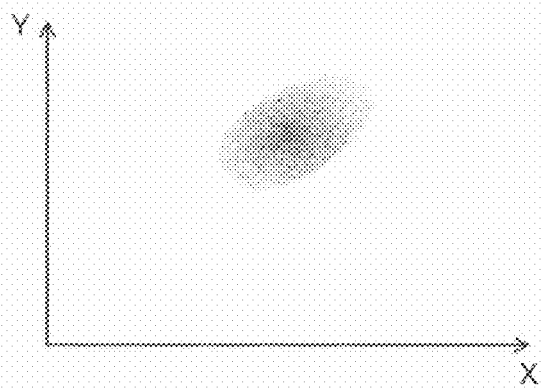
FIGS. 4A to 4C are diagrams illustrating an example of a distribution of spatial frequencies, which are plotted in a two-dimensional x-y coordinate system in FIGS. 4A and 4B, and which are plotted in a histogram in a polar coordinate system in FIG. 4C.
Figure 4B:
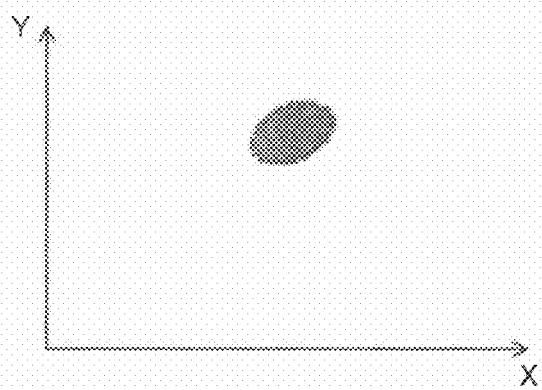
Figure 4C:
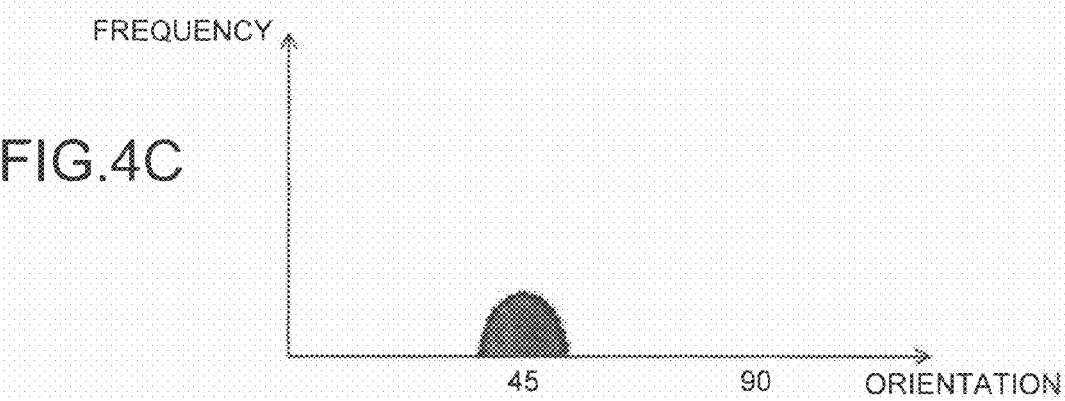

Calculation of the polar coordinate histogram is more specifically described below with reference to an example illustrated in FIGS. 4A to 4C. When two-dimensional spatial-frequency information obtained by calculation using the spatial-frequency calculating unit 24 as illustrated in FIG. 4A is binarized depending on whether each value is equal to or higher than a predetermined threshold value or not, only an intensely-colored region illustrated in FIG. 4B remains. Spatial frequencies are plotted in the two-dimensional x-y coordinate system in FIGS. 4A and 4B. A plurality of spatial frequencies that form the intensely-colored portion lies in an orientation of approximately 45°. A relation between this orientation and a frequency of a spatial frequency that appears in a specific orientation can be represented in a histogram. In the histogram, spatial frequencies are concentrated on a neighborhood of an orientation of 45° indicated by "45" as illustrated in FIG. 4C. The primary orientation is a direction indicating a peak value of the histogram and can be obtained as 45° from FIG. 4C, which shows a peak value at 45°.

The primary orientation is obtained as described above. Thereafter, the primary spatial frequency in the primary orientation is calculated. Although various methods can be used for this calculation, methods described below can be employed to calculate the primary spatial frequency.

According to one of the employable methods mentioned above, a peak value of the spatial frequency can be utilized as the primary spatial frequency when a spatial frequency distribution is unimodal, that is, when the distribution has a single peak in one cycle. However, in most cases, a spatial frequency has a complex distribution in which high-frequency components are generally weaker than low-frequency components. Thus, for example, often utilized is another method in which thresholding is performed based on a threshold value that is predetermined according to normalized spatial frequency components in a primary orientation and a maximal spatial frequency higher than the threshold value is determined as a principal spatial frequency, thereby to determine the principal spatial frequency in the direction.

FIG. 5 is a diagram illustrating a relation between spatial frequencies and intensities. In FIG. 5, normalized spatial frequency components in the primary orientation are plotted. Therefore, the maximum intensity of the spatial frequency components is set as 1. The threshold value is set as approximately 0.5. Thus, a spatial frequency in the range equal to or higher than 0.5 is obtained as the primary spatial frequency.

The LUT 26 is a correspondence table stored in an image processing system included in the image processing apparatus 10 by associating the primary spatial frequencies with a frequency of a line pattern. This table is determined in advance, as seen in FIG. 6. Here, a line pattern is a pattern configured by densely and regularly arranged parallel lines. The line pattern can perform half-toning by changing the thickness of each line according to the gradation of an image.

In the table illustrated in FIG. 6, the primary spatial frequencies are presented in cycles per degree (cpd) in the left column, while the frequencies of the line pattern are presented in the number of lines per inch in the right column. An example that uses the table is described below; however, when there is a simple relation between the primary spatial frequencies and the line pattern frequencies, the correspondence can be represented with a simple function instead of the table.

The colorless-pattern generating unit 25 determines a line pattern frequency from the primary spatial frequency calculated using the LUT 26 for each of the regions and can generate a line pattern to be applied to the region using the primary orientation calculated previously and the line pattern frequency. This line pattern is shown to a user as a transparent-toner pattern and is used in image formation when printing is performed according to a printing instruction designated from the user.

Actual operations to be performed by the image processing apparatus 10 are described with reference to a sequence diagram illustrated in FIG. 7. The image processing apparatus 10 is configured to include a user interface (UI) 61, a region dividing unit 62, a pattern generating unit 63, a repository 64, and a plotter 65. The UI 61 is operated and instructed by an operator 60, or a user, receives the operation and instruction designated by the operator 60, and presents indications to the operator 60. The UI 61 is configured to include the image input unit 20 that receives an input of an image. The pattern generating unit 63 is configured to include the spatial-frequency calculating unit 24 that calculates a spatial frequency of each region and the colorless-pattern generating unit 25. The repository 64 is configured to include the LUT 26. The region dividing unit 62 is similar to the region dividing unit 23.

The operator 60 designates the UI 61 to search for an input image. Upon receiving the designation, the UI 61 transfers the designation to the repository 64 to be used in search for the input image. Upon receiving the designation, the repository 64 retrieves the target image and transmits data pertaining to the image to the UI 61 for determination as to whether the retrieved image is the target image. The UI 61 displays the image on a display screen to show the image to the operator 60. The repository 64 is configured to include a storage device, such as a hard disk drive (HDD), a controller unit that controls the HDD, and a content management unit that manages stored contents.

When the operator 60 confirms that the image requested by the operator 60 is displayed, the operator 60 designates the UI 61 to generate a colorless pattern, which is a transparent-toner pattern. Upon receiving the designation, the UI 61 transmits the input image and the designation to the region dividing unit 62 first. Upon receiving the input image and the designation, the region dividing unit 62 interprets the designation and divides the input image into a plurality of regions. This regional division is performed using the method described above. The region dividing unit 62 returns a result of the regional division to the UI 61.

The repository 64 may return to the UI 61 a pointer indicating an address of the target image in lieu of the target image. The region dividing unit 62 can receive the pointer, obtain the image from the repository 64 using the pointer, and divide the image into the plurality of the regions. The region dividing unit 62 performs the regional division by analyzing the given image according to a predetermined criterion.

The UI 61 transmits the result of the regional division to the pattern generating unit 63 as region information. The pattern generating unit 63 calculates the spatial frequency in each of the regions and obtains the primary orientation and the primary spatial frequency as described above. The pattern generating unit 63 transmits the primary spatial frequency and the designation to search for a line pattern frequency to the repository 64, and obtains the line pattern frequency by referring to the LUT held by the repository 64. The pattern generating unit 63 generates the line pattern according to the previously calculated primary orientation and the obtained line pattern frequency and transmits the line pattern as a colorless-pattern image.

The colorless-pattern image may be held by the pattern generating unit 63 or stored in the repository 64. FIG. 7 illustrates an example where the colorless-pattern image is transmitted to the UI 61 and held by the UI 61. At this time, the pattern generating unit 63 may transmit a pointer indicating an address where the colorless-pattern image is stored in the repository 64 rather than the colorless-pattern image itself. Upon receiving the colorless-pattern image, the UI 61 displays the image on the display screen to indicate the image to the operator 60 so that the operator 60 can view the image. When the UI 61 has received the pointer, the UI 61 can read the colorless-pattern image stored at the address indicated by the pointer and displays the image on the display screen to show the image to the operator 60.

When the operator 60 approves of the indicated colorless-pattern image, the operator 60 can provide a next designation, such as a printing instruction, to the UI 61. Upon receiving the printing instruction, the UI 61 transmits the image held therein and the colorless-pattern image to the plotter 65.

The plotter 65 is equipment for printing. When the plotter 65 is electrophotographic equipment, the plotter 65 is configured to include a controller that controls whole of the plotter, toner for use in printing, a photosensitive element onto which the toner sticks to form a toner image, an exposure device that performs exposure at a predetermined position to form the toner image on the surface of the photosensitive element, a transfer device that transfers the toner image formed on the photosensitive element onto a surface of paper, a fixing device that fixes the transferred toner onto the surface of the paper, a sheet feeding device that feeds the paper, a paper conveying device that conveys the paper, and a sheet discharging device that discharges the paper.

The plotter 65 forms a colorless-pattern image with transparent toner utilizing the colorless-pattern image data in addition to forming four color images with toners of four colors, which are cyan, magenta, yellow, and black. The plotter 65 prints these images on a surface of paper and subjects the paper to a high-temperature high-pressure printing surface processor that is called a glosser, thereby outputting a highly-glossy printout. When the operations to be performed by the plotter 65 are completed, the plotter 65 transmits a message notifying the UI 61 of the completion of the printing operation. Upon receiving the message, the UI 61 indicates the message to the operator 60 and allows the operator 60 to recognize that the printing operation has been completed.

The printed surface is fused and made flat by high temperature and high pressure applied thereto while passing through the glosser. This makes the surface smoother and hence gives a high gloss to the surface. Meanwhile, for the purpose of watermarking or the like, there can be employed a configuration that gives only a gloss of a similar level to that given to normal printout by skipping the process performed by the glosser.

A sequence of image processing operations has been described roughly with reference to FIG. 7. The image processing operations will be described in detail below with reference to FIG. 8. The procedure until the UI 61 transmits the image data and the designation to the region dividing unit 62 has already been described above and therefore repeated description thereof is omitted. The region dividing unit 62 receives the image data and the designation, interprets the designation and the image, and performs regional division according to the designation and the predetermined criterion. The regional division is performed by iteratively dividing the image according to the criterion into four quarters and merging the sub-regions according to the criterion. The region dividing unit 62 transmits a result of the regional division by which a larger region has been divided into a plurality of smaller regions, that is, information about a shape and the like in each of the sub-regions, to the UI 61.

The UI 61 displays the result of the regional division on the screen to show the result to the operator 60. Simultaneously, the UI 61 holds the result of the regional division. The operator 60 views the result of the regional division and transmits an approval message, such as "OK," if the operator 60 approves the result. Upon receiving the message, the UI 61 transmits the message and the result of the regional division held by the UI 61 to the region dividing unit 62. When the region dividing unit 62 recognizes that the designation is not a colorless-pattern generating instruction based on the message, the region dividing unit 62 transmits the result of the regional division as region information together with the image and a pattern-generating instruction to the pattern generating unit 63 so as to generate a pattern.

Upon receiving the pattern-generating instruction, the pattern generating unit 63 performs spatial frequency expansion using the image and the region information transmitted to the pattern generating unit 63 together with the pattern-generating instruction. Generally, regions into which an image is divided are not always rectangular. Accordingly, a bounding box is defined on each of the regions and the gap between the region and the bounding box is padded with predetermined values, such as RGB=(0, 0, 0). Information on this rectangular region is expanded in spatial frequencies, thereby to obtain two-dimensional spatial frequency information pertaining to the region. Subsequently, a polar coordinate histogram is calculated from the obtained two-dimensional spatial-frequency information as preprocessing for finding the primary orientation. The polar coordinate histogram is produced based on binary information obtained by performing the thresholding on the two-dimensional spatial-frequency information as described above. A primary orientation of the region is obtained by calculating a peak value of the produced polar coordinate histogram. Subsequently, a primary spatial frequency is obtained by thresholding the spatial frequency distribution in the primary orientation.

The pattern generating unit 63 transmits the primary spatial frequency and the designation to search for a line pattern frequency to the repository 64. The repository 64 searches the LUT 26 held therein for the primary spatial frequency so as to obtain the line pattern frequency corresponding to the primary spatial frequency. The repository 64 transmits the thus-retrieved line pattern frequency as data to the pattern generating unit 63. The pattern generating unit 63 generates the line pattern using the data pertaining to the line pattern frequency obtained in this way and the already-determined primary orientation. Note that the line pattern is generated in each of the regions.

The line pattern is formed by regularly arranged parallel lines. Therefore, the line pattern can be generated using the primary orientation, in which the parallel lines lie, and the line pattern frequency, which is the number of the lines per inch. Accordingly, the density per unit area is easily adjustable by adjusting periodicity (frequency) of the lines of which width has been determined in advance. Although the number of lines is adjusted in this example, intervals between the lines may alternatively be adjusted. According to an aspect of the present embodiment, the line pattern frequency is adjusted by utilizing this feature, thereby adjusting an areal density which corresponds to the amount of the transparent toner that is to be eventually obtained. In addition, printed transparent toner can give texture specific to the line pattern to each region.

When the pattern generating unit 63 has generated line patterns for all the regions, the pattern generating unit 63 forms a colorless-pattern image based on the patterns and transmits the colorless-pattern image as data to the UI 61. The UI 61 shows the data to the operator 60 by displaying the data as the colorless-pattern image on the display screen. When the operator 60 approves the shown colorless-pattern image, the operator 60 provides a printing instruction as a next designation to the UI 61. Upon receiving the printing instruction, the UI 61 transmits data pertaining to the image held by the UI 61 and the colorless-pattern image to the plotter 65.

The plotter 65 forms a colorless-pattern image with transparent toner in addition to forming four color images with four color toners, which are cyan, magenta, yellow, and black toners. The plotter 65 prints these images on a surface of paper and subjects the paper to the high-temperature high-pressure printing surface processor that is called the glosser, thereby outputting a highly-glossy printout. The plotter 65 transmits a message notifying the UI 61 of the completion of the printing operation. When the UI 61 shows the message to the operator 60, the series of the operations is completed.

Another example of the image forming operation to be performed using the image forming apparatus according to another embodiment will be described in detail below with reference to FIG. 9. The procedure until the UI 61 transmits the input image and the designation to the region dividing unit 62 has already been described with reference to the sequence diagrams illustrated in FIGS. 7 and 8 and therefore repeated description thereof is omitted. The processing after the pattern generating unit 63 transmits the colorless-pattern image to the UI 61 are similar to the sequence diagrams illustrated in FIGS. 7 and 8 and therefore repeated description thereof is omitted. Hence, only operations different from those described above will be described below.

The result of the regional division performed by the region dividing unit 62 is transmitted as the region information to the pattern generating unit 63. Upon receiving the result, the pattern generating unit 63 calculates a size and an average brightness of each region from the result. The average brightness can be calculated by taking a simple average over brightness values from the region information obtained as the result. In the split-and-merge algorithm, a region number is assigned to each region for the purpose of identification. Accordingly, the sizes and the average brightness values of the regions can be managed using the region numbers.

Similarly, it is also possible to manage the sizes and the average brightness values of the regions in other algorithms by analyzing the image after the regional division. FIG. 10 illustrates an example of a data structure for managing the region size and the average brightness value for each region. The region sizes are represented in the number of pixels. The average brightness values can be obtained according to an image format of the input image. For example, when 8-bit depth is assigned to each color of R, G, and B, an average brightness value can be obtained by taking an average of pixel values of the region in each of the R, G, and B planes.

Entities of the table illustrated in FIG. 10 are sizes of the regions and average brightness values corresponding to the region numbers assigned to the regions. The region size is the number of pixels in each region. The average brightness value is an average of the pixel values calculated as described above. Thus, the table is configured to have input fields of which number is the same as the number of the regions, and values are substituted into the input fields. As in the case of the LUT 26 illustrated in FIG. 6, this table is also stored in and managed by the repository 64.

The region sizes can be used to change the LUT for use in generating the transparent toner pattern. For instance, the LUT may be changed according to the region sizes when it is desired to apply line patterns only to a region of which the region size is equal to or greater than a specific size so that a unique texture is provided to the region. For this purpose, a table in which region sizes and LUTs are associated with each other as illustrated in FIG. 11 can be stored in and managed by the repository 64.

The table illustrated in FIG. 11 is configured such that an LUT identified by LUT s1 is to be used when the region size is in a range from 1 to 100 pixels or a range from 101 to 1,000 pixels, an LUT identified by LUT s2 is to be used when the region size is in a range from 1,001 to 10,000 pixels, and an LUT identified by LUT s3 is to be used when the region size is greater than 10,001 pixels.

Transparent toner acts to change a gloss on a printed surface. Accordingly, the average brightness values of the regions can be used for a selective use of an LUT appropriate to a case where priority is desirably given to texture and an LUT appropriate to a case where priority is desirably given to a gloss on a printed surface. For this purpose, a table in which the average brightness values of regions are associated with the LUTs as illustrated in FIG. 12 can be stored in and managed by the repository 64.

The table illustrated in FIG. 12 is configured such that an LUT identified by LUT i1 is to be used when the average brightness value is in a range from 1 to 50, an LUT identified by LUT i2 is to be used when the average brightness value is in a range from 51 to 100, an LUT identified by LUT i3 is to be used when the average brightness value is in a range from 101 to 150, a range from 151 to 200, or a range from 201 to 255.

Each of the two tables is for use in eventually determining the line pattern frequency. Therefore, one of the methods for determining the line pattern frequency based on the region size and the method for determining the same based on the average brightness value can be used. Accordingly, a choice between the two methods can be offered to the user so that a table is selected according to the method selected by the user, an LUT to be used is obtained from the table, and a line pattern is generated using the LUT.

After the region sizes and average brightness values are calculated and substituted into the table illustrated in FIG. 10, spatial frequency expansion is performed using the two-dimensional FFT or the like as in the example described above, thereby calculating spatial frequencies for each of the regions. Thereafter, the calculated spatial frequencies are binarized, and a polar coordinate histogram is produced using frequencies of the calculated spatial frequencies so as to determine a primary orientation. An orientation where a peak value lies is determined as the primary orientation based on the histogram. By normalizing and thresholding spatial frequency components in the primary orientation, a primary spatial frequency is determined.

The primary spatial frequency, region sizes, and average brightness values thus-calculated are transmitted to the repository 64. The repository 64 searches for a line pattern by referring to tables such as those illustrated in FIGS. 10 to 12. Although not shown, a choice as to whether a preset table or which one of the tables is to be used is provided to the operator 60, and an LUT to be used is determined according to a selection made by the operator 60.

For instance, in a situation where a region number of a region to be processed is 1 and a region size is 50 pixels, the pattern generating unit 63 transmits this information together with a primary spatial frequency and an average brightness value to the repository 64. When it is determined in advance to use the table illustrated in FIG. 11, the repository 64 records these information pieces in the table illustrated in FIG. 10, and determines that an LUT to be used is the LUT s1 by referring to the table illustrated in FIG. 11. The repository 64 reads out the LUT s1, searches the LUT s1 for the line pattern frequency using the primary spatial frequency, and obtains the number of lines as a result of the search.

The repository 64 returns the number of lines obtained by the search to the pattern generating unit 63. The pattern generating unit 63 generates a line pattern, which is a transparent-toner pattern, according to the number of lines received from the repository 64 and the primary orientation calculated by the pattern generating unit 63 itself.

The line pattern is configured by equidistant parallel lines of which a line width has been determined in advance. Accordingly, the line pattern can be generated if the orientation, in which the lines lie, and the number of lines are known. This orientation is the primary orientation, and the number of lines can be obtained from the line pattern frequency. The pattern generating unit 63 transmits the line pattern generated in this way to the UI 61 so as to show the line pattern to the operator 60. These operations are repeated for the number of times equal to the number of the regions.

As described above, an image is divided into regions by the region dividing unit 23 using an appropriate algorithm, such as the split-and-merge algorithm or the mean shift algorithm. When the spatial frequency components of the divided regions are calculated, processing of the spatial-frequency analysis is performed. To the analysis, the two-dimensional Fourier transform or the wavelet transform can be applied.

Figure 13:
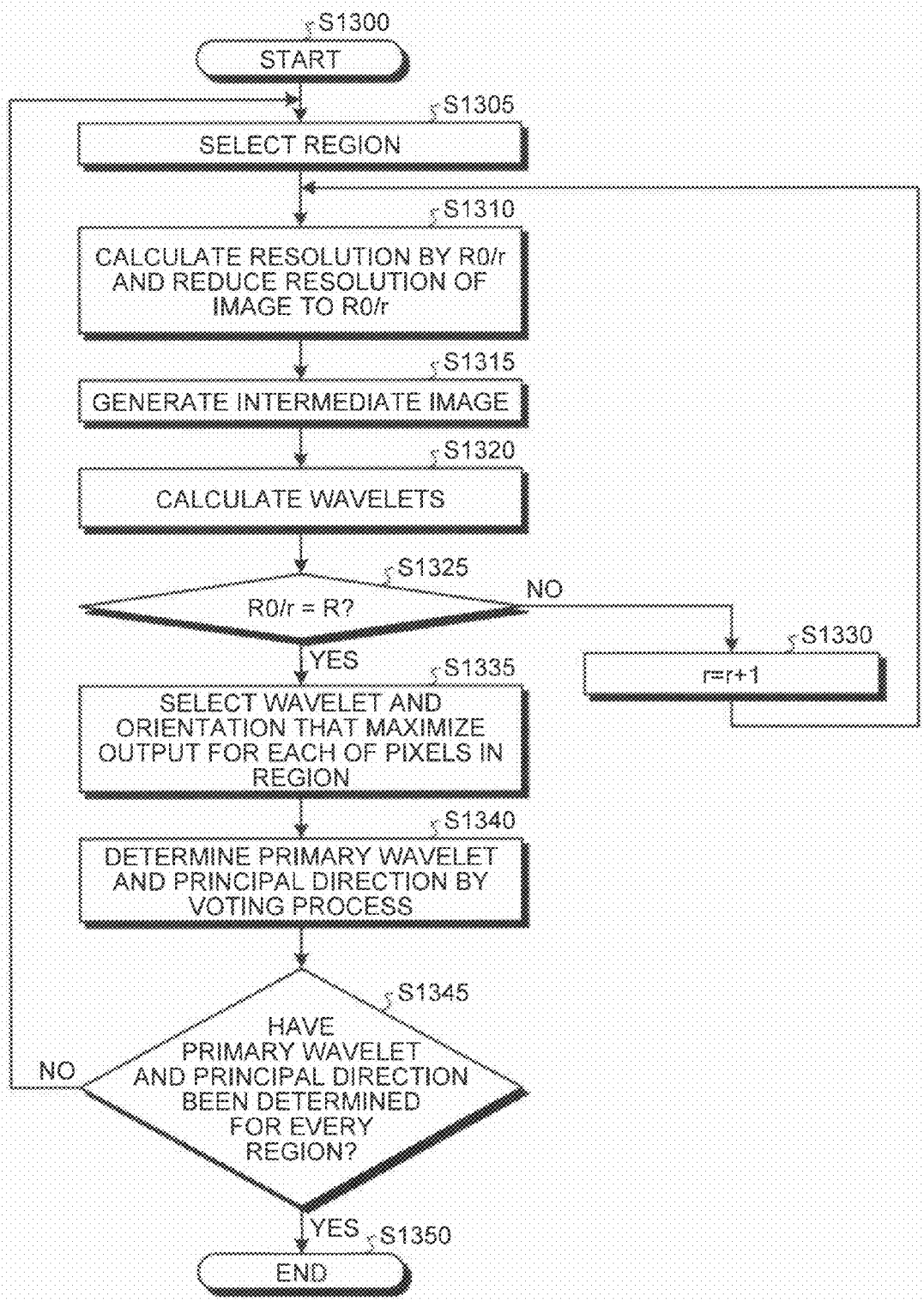
FIG. 13 is a flowchart illustrating a sequence of operations for spatial frequency analysis using discrete wavelets.

Spatial-frequency analysis using the wavelet transform will be described in detail with reference to FIG. 13. FIG. 13 is a flowchart illustrating a sequence of operations for performing the analysis using the Haar wavelet which is one of discrete wavelets. These operations are performed by the spatial-frequency calculating unit 24.

The Harr wavelet is a two-dimensional wavelet. Methods for performing analysis using a two-dimensional wavelet includes a method that performs analysis using a plurality of two-dimensional wavelets that differ from each other in primary spatial frequencies and a method that performs analysis by converting an input image into images with a plurality of resolutions and a process is performed using a predetermined set of two-dimensional wavelets. Either one of the methods can be employed in the present embodiment because any method that provides peak frequencies and the orientations thereof in each region can satisfactorily be used. An example will be described below of an analysis using a set of the two-dimensional wavelets according to the latter method.

This analysis is started from Step S1300 after the region dividing unit 23 has divided an input image into N regions. One of the regions is selected at Step S1305. The region dividing unit 23 assigns region identification information, such as a number, to each of the N regions into which the image has been divided. The spatial-frequency calculating unit 24 selects, for instance, one region in an ascending order of the assigned numbers.

Resolution of the selected region is reduced using a resolution R0 of the input image and a preset resolution-reduction index r. For instance, when the resolution R0 of the input image is 1,500 dots per inch (dpi) and the index r is 2, resolution reduction is performed to change the region into an image of which resolution is 750 (=1,500/2) dpi. This resolution reduction can be performed by trimming or binning pixels.

An intermediate image is generated from the image of the selected region at Step S1315. The intermediate image is an integral image such that a pixel at a point (x, y) is provided with a sum of pixels in a rectangular region whose diagonal is a line segment connecting between the origin (0, 0) of the input image and the position (x, y) of the intermediate image.

At Step S1320, the Haar wavelet at the resolution is calculated utilizing the intermediate image generated at Step S1315. Described below is an example of the calculation of a wavelet W illustrated in FIG. 3A using an intermediate image (in FIG. 3A, each of black pixels is assumed as +1, while each of white pixels is assumed as −1). Suppose that the position of the origin (0, 0) is at the upper left corner, and the lower right corner of the intermediate image is at the position (4, 4), and a value at the position (x, y) in the intermediate image is denoted by H(x, y), W can be expressed by Equation (5) below.

$$W = H(4,4) - H(2,4) \qquad (5)$$

The wavelet W can be calculated by a single subtraction as indicated by Equation (5). In addition, a wavelet of each orientation can be calculated by using a Viola-Jones object detection algorithm or the like. For the details on the object detection algorithm, see (URL: http://en.wikipedia.org/wiki/Viola%E2%80%93Jones_object_detection_framework).

At Step S1325, it is determined whether a value obtained by dividing the resolution R0 of the input image by the resolution-reduction index r is equal to a minimum resolution R. When R0/r is equal to R, it is indicated that the resolution has been reduced to the minimum resolution R, and therefore process control proceeds to Step S1335 to perform a next operation. On the other hand, when R0/r is not equal to R, it is indicated that the resolution has not been reduced to the minimum resolution R yet, and therefore process control proceeds to Step S1330 to reduce the resolution further. At Step S1330, the index r is incremented by 1, and process control returns to Step S1310. In the example described above, the resolution R0 is 1,500 dpi and the index r becomes 3 (=2+1) at Step S1330. Accordingly, the resolution is reduced to the resolution of 500 (=1,500/3) dpi.

At Step S1335, a wavelet and the orientation thereof at which output intensity is maximized are selected for each of the pixels in the selected region from the wavelets of the orientations calculated at each resolution. Thereafter, a voting process is performed on the wavelets and the orientations thereof that maximize output intensity of the pixels in the selected region. A wavelet and the orientation thereof having acquired a greatest number of voting are determined as a primary wavelet and a primary orientation of the selected region.

At Step S1345, it is determined whether the number of regions of which the primary wavelet and the primary orientation have been determined has reached N, which is the number of regions into which the image has been divided. In short, it is determined whether the determination has been made for every region. When the number has reached N, process control proceeds to S1350 and the spatial-frequency analysis is completed. On the other hand, when the number has not reached N yet, it is indicated that there is a region in which the determination has not been made yet, and therefore process control returns to Step S1305 to select a next region.

Only the example using the Haar wavelet has been described; however, the spatial-frequency analysis can be performed using a Daubechies wavelet which is also a discrete wavelet.

As described above, a pattern of a colorless recording material, or, more specifically, transparent toner, can be determined in a region-adaptive manner by dividing an image into a plurality of regions, determining spatial frequencies corresponding to a feature amount for each of the regions, and generating a pattern to be applied to the region using the spatial frequencies for the corresponding region.

The image processing apparatus can determine the number of lines in the line pattern.

The pattern generating unit determines an orientation in which the lines that form the line pattern extend based on an orientation in which the peak value is given for each of the regions. The pattern generating unit can generate the line pattern of the colorless recording material according to the orientation and the number of lines determined as described above.

By being associated with a first table to be used, region sizes obtained as the number of pixels in the corresponding regions are stored in a second table by the storage unit. By using this second table, it becomes possible to apply a line pattern and thereby to give a unique texture with the colorless recording material only to a region with a size equal to or greater than a particular size.

The storage unit can also store a third table in which average brightness values of the pixels in the regions are associated with the first table to be used. By using the third table, it becomes possible to give priority to texture and a gloss on a printed surface of the paper.

As a result, it becomes possible to determine the number of lines of a line pattern using a table directly selected by a user to generate a pattern of a colorless recording material.

The present embodiment can provide not only the image processing apparatus described above but also an image processing method for causing an image processing apparatus to generate a pattern of a colorless recording material to form an image with the colorless recording material.

The present embodiment can also provide a computer program for causing a computer to execute the image processing method. The computer program can be provided by downloading from a recording medium that stores the computer program, or, alternatively, can be provided as being stored in a recording medium.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that generates a pattern of a colorless recording material to form an image using the colorless recording material, the image processing apparatus comprising:

a region dividing unit that divides an input image into a plurality of regions as divided regions using a designated algorithm and pixel values of pixels that form the image;

a spatial-frequency calculating unit that calculates spatial frequencies in each of the divided regions using pixel values in the divided region; and a pattern generating unit that generates a pattern of the colorless recording material, which is set to each of the divided regions, using the calculated spatial frequencies and a line pattern having a preset line width.

2. The image processing apparatus according to claim 1, further comprising:
a storage unit that stores one or more first tables, in which a peak value obtained as a value of a maximal frequent frequency among the calculated spatial frequencies is associated with a line pattern frequency that represents number of lines in the line pattern.

3. The image processing apparatus according to claim 2, wherein the pattern generating unit determines an orientation in which the lines that form the line pattern extend based on an orientation in which the peak value is given for each of the divided regions.

4. The image processing apparatus according to claim 2, wherein the storage unit stores a second table in which region sizes obtained as numbers of pixels in the divided regions are associated with the first table to be used.

5. The image processing apparatus according to claim 2, wherein the storage unit stores a third table in which average brightness values of the pixels in the divided regions are associated with the first table to be used.

6. The image processing apparatus according to claim 2, further comprising:
a table presenting unit that presents the one or more first tables; and
a table reading unit that reads the first table selected from the storage unit in response to receipt of a selection from a user.

7. The image processing apparatus according to claim 1, wherein the spatial-frequency calculating unit calculates the spatial frequencies using any one of a Fourier transform and a wavelet transform.

8. The image processing apparatus according to claim 1, wherein
in response to receipt of designation of a plurality of regions from a user, the region dividing unit divides the input image into the plurality of regions using the algorithm.

9. The image processing apparatus according to claim 1, wherein the region dividing unit automatically divides the input image into the plurality of regions based on a predetermined feature set of the image using the algorithm and the pixel values.

10. An image processing method for causing an image processing apparatus to generate a pattern of a colorless recording material to form an image using the colorless recording material, the image processing method comprising:
dividing, by a region dividing unit of the image processing apparatus, an input image into a plurality of regions as divided regions using a designated algorithm and pixel values of pixels that form the image;
calculating, by a spatial-frequency calculating unit of the image processing apparatus, spatial frequencies in each of the divided regions using pixel values in the divided region; and
generating, by a pattern generating unit of the image processing apparatus, a pattern of the colorless recording material, which is set to each of the divided regions, using the spatial frequencies calculated at the calculating and a line pattern having a preset line width.

11. The image processing method according to claim 10, wherein, by using one or more first tables stored in a storage unit of the image processing apparatus, number of lines in the line pattern is determined at the generating in each of the divided regions based on a peak value obtained as a value of a maximal frequent frequency among the calculated spatial frequencies.

12. The image processing method according to claim 11, wherein an orientation in which lines that form the line pattern extend is determined at the generating based on an orientation in which the peak value is given in each of the divided regions.

13. The image processing method according to claim 11, wherein the first table to be used is acquired at the generating using a second table stored in the storage unit based on a region size obtained as number of pixels in the divided region.

14. The image processing method according to claim 11, wherein the first table to be used is acquired at the generating using a third table stored in the storage unit based on an average brightness value of the pixels in the divided region.

15. The image processing method according to claim 11, further comprising:
presenting the one or more first tables to a user; and
reading the first table selected from the storage unit in response to a selection from the user.

16. The image processing method according to claim 10, wherein the spatial frequencies are calculated at the calculating using one of a Fourier transform and a wavelet transform.

17. The image processing method according to claim 10, wherein, in response to receipt of designation of a plurality of regions from a user, the dividing divides the input image into the plurality of regions using the algorithm.

18. The image processing method according to claim 10, wherein the dividing automatically divides the input image into the plurality of regions based on a predetermined feature set of the image using the algorithm and the pixel values.

19. A computer program product comprising a non-transitory computer-usable medium having a computer-readable program code embodied in the medium causing an image processing apparatus to perform an image processing method of generating a pattern of a colorless recording material to form an image using the colorless recording material, the image processing method comprising:
dividing an input image into a plurality of regions as divided regions using a designated algorithm and pixel values of pixels that form the image;
calculating spatial frequencies in each of the divided regions using pixel values in the divided region; and
generating a pattern of the colorless recording material, which is set to each of the divided regions, using the spatial frequencies calculated at the calculating and a line pattern having a preset line width.

* * * * *